United States Patent Office 2,824,420
Patented Feb. 25, 1958

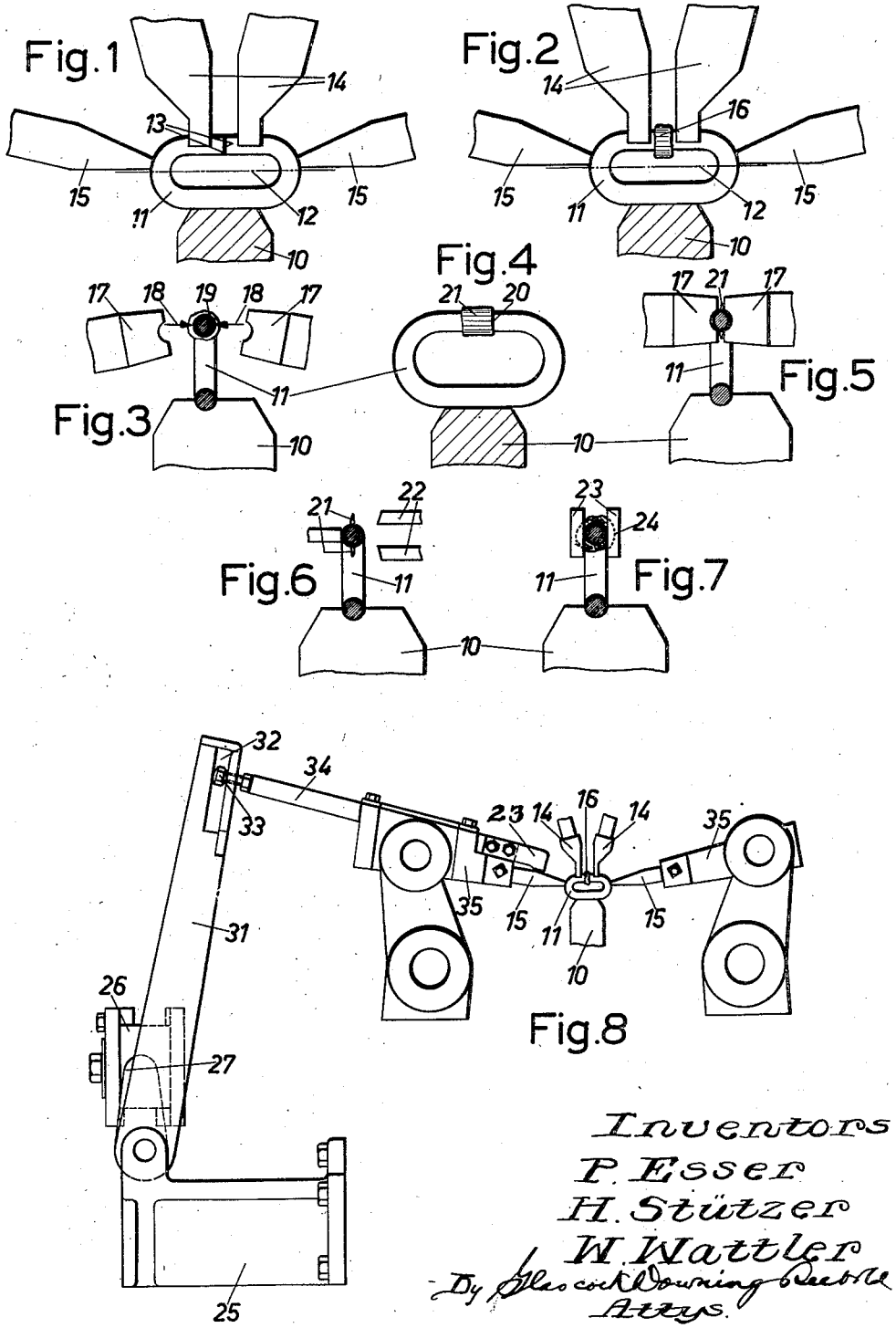

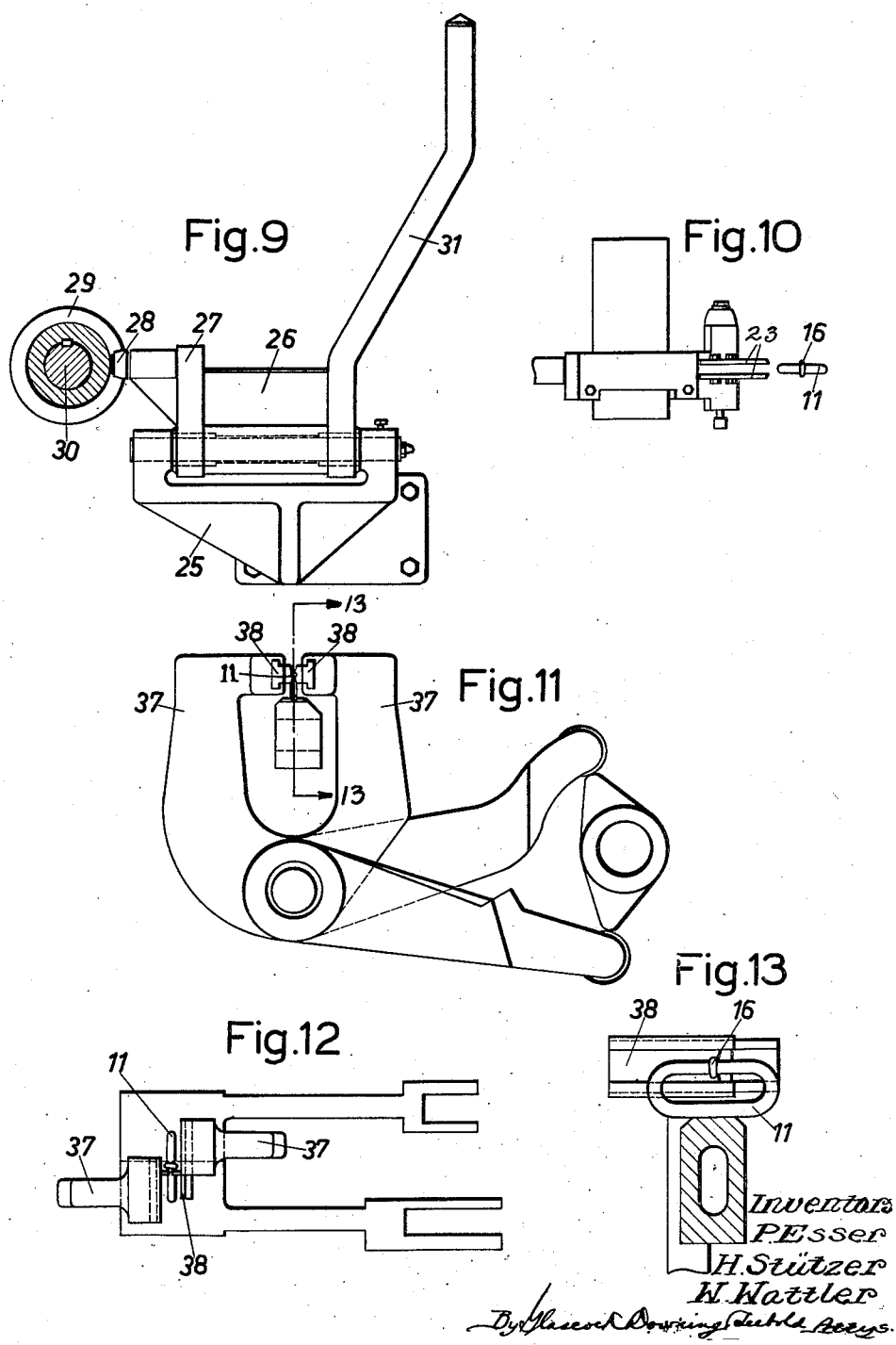

2,824,420
APPARATUS FOR WELDING A CHAIN LINK AND THEREAFTER TRIMMING THE FLASH FROM THE WELD

Paul Esser, Koln-Raderberg, Hans Stützer, Koln-Bickendorf, and Wilhelm Wattler, Koln-Zollstock, Germany Application January 2, 1953, Serial No. 329,178

2 Claims. (Cl. 59—31)

This invention pertains to an improved method and apparatus for the manufacture of chains from wire, particularly of high strength, hard wire, by resistance welding.

In the known chain welding machines using the butt welding method, the two ends of the chain link are heated by electric resistance, clinched together, pressed or forged, and the burr or upstanding edge produced by the pressing is then removed. This method, which was generally adequate, especially for chains of relatively soft material (namely as regards appearance as well as rigidity of the chain), is far from perfect when using so-called alloy steels. It is known that after upsetting hard materials like manganese steel, the weld bulge must be kept under pressure for some time before the upsetting irons can release the link. Since the material being worked is very hard and tough and not readily deformable, the part upset under the influence of upsetting irons to a welding bulge, and forged back by means of pressing irons to the original wire diameter, does not combine with the basic wire. The transition spots between the weld and the wire tend to be cracked, scaled, and show evidences of impurities. During later dynamic loading, especially shock loading, of the chain, these spots lead to an early fracture of the chain.

According to the present invention the manufacture of such chain links welded by the resistance method is changed in such a manner that instead of the link being first heated at the ends, then upset, subsequently pressed and finally the burr remnants which were not pressed back into the wire diameter removed, the procedure is changed so that the heating and upsetting steps are followed immediately by the removal of the welding bulge. The removal of the welding bulge can be carried out according to the desired quality and appearance of the chain throughout the entire periphery of each link or only part thereof. If the burr is completely removed, subsequent pressing is superfluous, but if the removal of the burr is only partial, the welding spot will subsequently be pressed.

The consequences of this change of the known method steps are such that the appearance as well as the corrosion resistance of such chain links is substantially improved, particularly with regard to dynamic loads, since the bulge originating in upsetting and in which any impurities and flaws would occur is not pressed by the pressing step into the wire link, nor does it extend beyond the link in the form of scales. Thus chains manufactured according to the applicant's method have neither the usual diminution in appearance nor the weakened mechanical properties which arise from use of the previously known methods. Also the invention eliminates the sources of premature corrosion, which in chains manufactured according to the prior art process were to be found in the cracked spots at or near the welding seams.

However, as hereinbefore remarked, it is not absolutely essential, during the short period a link remains in the welding position, which in known chain machines lasts only a few seconds, that the entire circumference of the welded spot, where the bulge has been formed, be treated to remove the bulge; as a rule the pressing irons work only at two opposite sides on the bulge, and only at this position does the disadvantage of scale formation originate. Thus, as to these positions, a subsequent cleaning-off may appear superfluous, as they normally (in hard chain-steel) appear completely smooth.

The step of cleaning off the burr which, in known methods, was not only carried out subsequently, but could be restricted to the spots above and below the pressure spot, according to the new method is not only carried out earlier in the manufacture, but is also applied locally to the parts of the weld facing the pressure spots before applying the pressure to the remaining burr.

The apparatus for practicing the last described modification of the method according to the invention accordingly may be constructed by providing two burr cleaning-off knives arranged in a common holder and spaced the distance of the wire diameter from each other, which knives lie parallel to the plane of the link and are guided perpendicularly to the moving direction of movement of the pressing irons so that the bulge is removed from the sides of the link where the pressing tools act on the weld. If then the pressing tools are made to act only in the described position on the chain link, small burr formations will appear above and below which may be cleaned off in a known manner by an additional burr-cleaning device. Within the purview of the method it is also possible to entirely dispense with the known cleaning-off by suitable design of the machine so that after cleaning-off of the bulges according to the invention, by cleaning off the entire peripheral part immediately after the upsetting step, further cleaning may be omitted.

In the construction of the apparatus it has proven advantageous not to dispose the moving direction of the burr-cleaning knives for partial burr-cleaning on the longitudinal link axis, but at an angle thereto and as acute as possible, because then the structural placement of the burr cleaning device is made simpler.

The device for receiving and moving the burr cleaning knives in this manner obstructs the access to the chain link very little, and also the remaining parts of the known automatic chain welding machines can be retained without change and without redesigning the structure.

It has already been mentioned that it is advantageous to mount the two burr-cleaning knives for operating in the same direction and at the same speed, also for simultaneous engagement, and accordingly to secure both knives to a common holder which then can be connected to a corresponding moving device.

The construction in which the burr-cleaning knives are mounted to move at an angle as acute as possible to the longitudinal link axis, in connection with the use of a holder, offers the possibility of mounting this holder on one of the two lever heads for the upsetting irons which are slidable longitudinally. In this manner the additional and novel burr-cleaning device also acquires the character of an auxiliary structure which can be attached to existing conventional chain-welding machines.

The motion of the knives and, in a like manner, that of the holder common to them, can be effected in different ways, for example, pneumatically, hydraulically, electrically, by springs and lugs and so forth. An especially simple driving means, however, provides that the motion of the holder constructed as a pusher for the burr-cleaning knives is effected through a cam disc and a lever device driven mechanically from the general machine drive or from a shaft driven thereby and which is preferably continuously rotating. How the moving parts are constructed in detail, whether another element is chosen in place of the cam disc or whether other solutions known in themselves are used in the purview of this arrangement, is of no importance for carrying out the mechanical drive.

In the drawing several exemplary embodiments of known constructions and operating methods and also an embodiment of the invention are illustrated. In the drawings, Figs. 1 to 6 illustrate steps in conventional chain welding machines, Fig. 7 shows a step in the system of the invention, Fig. 8 is a view like Fig. 1, with a link shown in elevation, together with details of a possible drive in accordance with the invention, Fig. 9 is a side view of the actuating device illustrated in Fig. 8 for the burr removing device, Fig. 10 is a top plan view of a portion of Fig. 8, Fig. 11 is a side view of a novel burr-cleaning device adapted for addition to existing machines, Fig. 12 is a top view of the same, and Fig. 13 is a sectional view on line 13—13 of Fig. 11.

Referring to Fig. 1, a chain link is shown in the welding machine of known construction during the welding process. On saddle 10 link 11 rests, the longitudinal link axis being horizontally disposed and the ends 13 on top. The electrodes 14 generate the necessary welding heat while the upsetting irons or tools 15 merely engage and press the link ends.

Fig. 2 shows the same arrangement, the upsetting tools 15 having begun to act and cause the joining of the two link ends, whereby a welding bulge 16 is formed.

In Fig. 3, according to the heretofore known methods, the removal of the bulge is effected by the pressing tools 17 in such a manner that the material in the bulge is pressed in the direction of arrows 18 and partially settle in marginal zones 19, and partly (as shown by Fig. 4) settle in scales 20 on the periphery and finally, as may be seen in Fig. 5, are transformed by being extruded outwardly to form two pronounced burrs or flashes 21 which then (as appears from Fig. 6) can be removed by two burr cleaning knives 22.

The present process as illustrated in Fig. 7, according to the invention, is altered by guiding two burr cleaning knives 23 (after the butt weld formation according to Fig. 2) laterally of the chain link and removing the material accumulations 24 shown in dotted lines at the bulge. Subsequently pressure is exerted in the same way as illustrated in Figs. 3 and 5, and then once more cleaned of burr as shown in Fig. 6.

The appliance for practicing the partial burr cleaning method is illustrated by way of example and diagrammatically in Figs. 8 and 9. In Fig. 8 in the link is shown in the position seen in Figs. 1, 2 and 4, i. e. in side elevation, while Fig. 9 shows a detail of the actuating device seen in Fig. 8.

The mounting block 25 is fastened to a machine frame (not shown) and carries a two-arm lever 26. Both parts are also illustrated in Fig. 9. One arm 27 of the lever, by means of a roller 28, abuts a cam disc 29 which is fixed on a countershaft 30 of the machine. The motion of arm 27 is participated in by the longer arm 31. This arm as shown by Fig. 8 carries a slot guide 32 in which the corresponding end 33 of a pitman 34 is held. This end 33 is adjustable with respect to the pitman 34 lengthwise thereof, so that the position of the pitman 34 when the lever 26 is in its normal position can be changed. The pitman 34 is slidably mounted on the left-hand lever head 35 of the upsetting tool 15 and carries at its end two burr-cleaning knives 23 which generally conform to the burr-cleaning knives 23 according to Fig. 7. The arrangement is also shown in Fig. 10, which is a top plan view.

The operation of the device is as follows:

As soon as the electrodes 14 have heated the chain link 11 at both ends to welding incandescence, the link 11 is clinched together by the two upsetting tools 15 which are fastened on the lever heads 35 so that the welding bulge 16 is made.

After the lifting of the electrodes 14, the two-arm lever 26, is moved by the control shaft 30 and the cam disc 29 which moves in the pitman 34 and thereby the two burr cleaning knives 23 are advanced and the two burr surfaces 24 shown in Fig. 7 are cut off. During the subsequent pressing of the remaining welding bulge as shown in Figs. 3 and 5, only small marginal parts of the butt masses are forged into the wire joint, and the remaining burr is removed as shown by Fig. 6 by a known appliance.

One advantage arising from the arrangement according to the invention consists in the fact that during this process the two pressure tools 17 no longer press scale into the weld as was the case heretofore, for the cutting-face of the burr-cleaning knives 23 removes the material causing such scale formation.

Figs. 11 and 12 disclose a novel burr-cleaning device in elevation and in top plan view, respectively. The two levers 37 which heretofore carried the two tools serving for pressing or forging, are utilized for carrying the burr-cleaning knives. Instead of the two pressing or forging tools, two semi-circular burr cleaning knives 38 are mounted for movement lengthwise of the link.

The operation is as follows: After the link has been heated by the electrodes, the welding spot is upset in a known manner. After upsetting, the two levers 37 carry the burr-cleaning knives 38 toward the chain link 11 as illustrated in Fig. 13; the semi-circularly shaped burr-cleaning knives 38 surround the chain link close to the welding butt on the entire periphery. Now the burr-cleaning lever 26 used in the process with partial burr cleaning according to Fig. 8 is used in this case without any burr-cleaning knife, by reason of its forward motion which will displace the semi-circular burr removing knives 38 by the width of the welding bulge and thereby remove same.

The structural execution and subsequent incorporation of this device for cleaning-off all burr, as illustrated in Figs. 11, 12 and 13, into an older machine is very simple.

What is claimed is:

1. In a machine for the electric welding of chain links each made of a single piece of metal bent to form an open link with its ends opposite to and in proximity to one another, said machine having means to hold the link in welding position, electrodes for engaging the link close to its ends and for passing a welding current across said ends, upsetting tools to press the ends of said link together to form the weld whereby the weld is made and a burr of heated soft metal is extruded around the weld, a slideway at an acute angle to the axis of the joined link ends on one of said upsetting tools, means to cut off said burr comprising a pitman slidably mounted on said slideway, a pair of straight edged burr-cutting knives, said knives having edges normal to the direction of sliding of said pitman and spaced to receive said link therebetween, means operatively connecting said pitman and said upsetting tool whereby said knives are advanced to engage the burr in the parallel planes of the sides of the link and progressively at an angle to the plane of the burr immediately upon completion of the upsetting operation to cut the burr from the sides of the link, and a pair of pressure tools operative subsequent to said knives and in a direction normal to the plane of the link to compact the metal at the weld and to deform the remaining burr into thin flashes lying in the plane of the link to facilitate subsequent removal.

2. The machine of claim 1, including a pair of parallel straight edged knives spaced apart the distance of the diameter of the material of the link, said pair of knives operating in a plane normal to the plane of the link to engage and sever said flashes.

References Cited in the file of this patent

UNITED STATES PATENTS

| | | |
|---|---|---|
| 1,382,193 | Holmes | June 21, 1921 |
| 1,790,464 | Du Bois | Jan. 27, 1931 |
| 2,125,967 | Taylor | Aug. 9, 1938 |
| 2,288,494 | Speed et al. | June 30, 1942 |
| 2,358,197 | Winter | Sept. 12, 1944 |

FOREIGN PATENTS

| | | |
|---|---|---|
| 15,564 | Great Britain | July 14, 1896 |
| 958,583 | France | Mar. 13, 1950 |